(12) United States Patent
Esmersoy et al.

(10) Patent No.: US 8,995,224 B2
(45) Date of Patent: Mar. 31, 2015

(54) REAL-TIME VELOCITY AND PORE-PRESSURE PREDICTION AHEAD OF DRILL BIT

(75) Inventors: Cengiz Esmersoy, Sugar Land, TX (US); Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 544 days.

(21) Appl. No.: 10/604,878

(22) Filed: Aug. 22, 2003

(65) Prior Publication Data
US 2005/0041526 A1  Feb. 24, 2005

(51) Int. Cl.
  *G01V 1/24* (2006.01)
  *G01V 1/42* (2006.01)
  *G01V 1/30* (2006.01)

(52) U.S. Cl.
  CPC . *G01V 1/42* (2013.01); *G01V 1/303* (2013.01)
  USPC ............ 367/27; 367/25; 367/38; 367/57; 702/9; 702/11; 702/14; 702/18

(58) Field of Classification Search
  CPC ........... G01V 1/303; G01V 1/42; G01V 1/48; G01V 11/00; E21B 21/08; E21B 49/003
  USPC ........... 367/25, 27, 35, 37, 38, 51, 52, 56–57, 367/81–83, 86, 31, 32; 181/102–106, 108; 702/9, 18, 11, 14; 175/40; 324/323
  See application file for complete search history.

(56) References Cited

U.S. PATENT DOCUMENTS

| | | | |
|---|---|---|---|
| 4,207,619 A * | 6/1980 | Klaveness | 367/36 |
| 4,363,112 A | 12/1982 | Widrow | |
| 4,592,031 A * | 5/1986 | Bradshaw et al. | 367/45 |
| 4,802,146 A * | 1/1989 | Moeckel | 367/52 |
| 4,819,214 A | 4/1989 | Gutowski et al. | |
| 4,894,807 A * | 1/1990 | Alam et al. | 367/15 |
| 5,130,949 A | 7/1992 | Ken et al. | |
| 5,144,589 A | 9/1992 | Hardage | |

(Continued)

FOREIGN PATENT DOCUMENTS

| | | |
|---|---|---|
| EP | 1680692 | 7/2006 |
| GB | 2272525 | 5/1994 |

(Continued)

OTHER PUBLICATIONS

Wilhelm, et al. "Prediction of Pressure Gradients from Seismic Velocities." Presented at AADE Industry Forum on Pressure Regimes in Sedimentary Basins and their Prediction, Sep. 2-4, 1998, Del Largo Resort.*

(Continued)

*Primary Examiner* — Daniel L Murphy
(74) *Attorney, Agent, or Firm* — Kimberly Ballew

(57) ABSTRACT

Techniques for estimating velocity ahead of a drill bit include generating seismic waves at a surface from at least two different source positions in the vicinity of a borehole, receiving seismic waves reflected from a reflector ahead of the drill bit at one or more locations in the borehole, determining travel times of the seismic waves received at the one or more locations in the borehole, and inverting the travel times to determine a velocity of a formation ahead of the drill bit. One embodiment includes transforming the velocity into pore pressure of the formation.

19 Claims, 6 Drawing Sheets

(56) References Cited

U.S. PATENT DOCUMENTS

| | | | |
|---|---|---|---|
| 5,282,384 A | | 2/1994 | Holbrook |
| 5,285,692 A | | 2/1994 | Steiger et al. |
| 5,305,836 A | | 4/1994 | Holbrook et al. |
| 5,343,440 A | * | 8/1994 | Kan et al. ............ 367/27 |
| 5,415,030 A | | 5/1995 | Jogi et al. |
| 5,442,950 A | | 8/1995 | Unalmiser et al. |
| 5,555,220 A | | 9/1996 | Minto |
| 5,615,115 A | | 3/1997 | Shilling |
| 5,712,829 A | | 1/1998 | Tang et al. |
| 5,841,280 A | | 11/1998 | Yu et al. |
| 5,870,690 A | | 2/1999 | Frenkel et al. |
| 5,995,446 A | | 11/1999 | Meyer et al. |
| 6,094,401 A | * | 7/2000 | Masak et al. ............ 367/84 |
| 6,131,694 A | | 10/2000 | Robbins et al. |
| 6,201,765 B1 | * | 3/2001 | Ireson ............ 367/38 |
| 6,351,991 B1 | | 3/2002 | Sinha |
| 6,382,332 B1 | * | 5/2002 | Eaton ............ 175/50 |
| 6,411,902 B1 | | 6/2002 | Wiltshire |
| 6,430,508 B1 | | 8/2002 | Sudhakar et al. |
| 6,462,549 B1 | | 10/2002 | Curtis et al. |
| 6,473,696 B1 | * | 10/2002 | Onyia et al. ............ 702/6 |
| 6,480,118 B1 | | 11/2002 | Rao |
| 6,609,067 B2 | | 8/2003 | Tare et al. |
| 6,751,558 B2 | | 6/2004 | Huffman et al. |
| 6,814,142 B2 | | 11/2004 | Paulk et al. |
| 6,819,110 B2 | | 11/2004 | Omeragic et al. |
| 6,826,486 B1 | | 11/2004 | Malinverno |
| 6,832,158 B2 | | 12/2004 | Mese et al. |
| 6,877,332 B2 | | 4/2005 | DiFoggio |
| 6,917,564 B2 | * | 7/2005 | Leaney ............ 367/73 |
| 6,977,866 B2 | | 12/2005 | Huffman et al. |
| 7,310,580 B2 | | 12/2007 | Zhou et al. |
| 2004/0184348 A1 | * | 9/2004 | Shook et al. ............ 367/57 |
| 2004/0244972 A1 | | 12/2004 | Sayers et al. |
| 2005/0041526 A1 | | 2/2005 | Esmersoy et al. |
| 2005/0150713 A1 | | 7/2005 | Garcia-Osuna et al. |
| 2005/0152219 A1 | | 7/2005 | Garcia-Osuna et al. |
| 2007/0127314 A1 | | 6/2007 | Wang et al. |

FOREIGN PATENT DOCUMENTS

| | | |
|---|---|---|
| WO | WO93/07514 | 4/1993 |
| WO | PCT/GB2004/01144 | 9/2004 |
| WO | 2005040860 A1 | 5/2005 |

OTHER PUBLICATIONS

Brewerm R.J. "The look ahead VSP survey: Its utility and future." Search and Discovery, 2002.*

Stewart, R.R. "Depth Imaging of Reservoirs Using Well Logs, VSP, and Surface Seismic Data." ASEG/SEG Conference, Adelaide, 1088.*

Lapin, et al. "Joint VSP and surface seismic tomography." SEG 2003.*

Graziella, et al. "Integrating borehole information and surface seismic for velocity anisotropy analysis and depth imaging." The Leading Edge, May 2001.*

Dezard, "Wave field extrapolation," Stanford Exploration Project Report SEP-41, Dec. 1984, pp. 217-250.*

Geophysics vol. 67, No. 4, Jul.-Aug. 2002 Sayers et al, "Predrill pore-pressure prediction using seismic data", p. 1286-1292.

JC Rasmus, "Reat-Time Pore-Pressure Evaluation From MWD/LWD Measurements and Drilling-Derived Formation Strength," SPE Drilling Engineering, Dec. 1991.

Ellingsrud et al., "Remote Sensing of Hydrocarbon Layers by Seabed Logging (SBL): Results from a Cruise Offshore Angola," The Leading Edge, Oct. 2002.

Constable et al., "Mapping Thin Resistors and Hydrocarbons with Marine EM Methods: Insights from ID Modeling," Geophysics, vol. 71, No. 2 (Mar.-Apr. 2006).

Constable, "Marine Electromagnetic Methods—A New Tool for Offshore Exploration," The Leading Edge, Apr. 2006.

Key et al., "Mapping 3D Salt using the 2D Marine Magnetotelluric Method: Case Study from Gemini Prospect, Gulf of Mexico," Geophysics, vol. 71, No. 1 (Jan.-Feb. 2006).

Barriol et al, "The Pressures of Drilling and Production," Oilfield Review, Autumn 2005.

Schlumberger, "sonicVision,".

Schlumberger, "MDT Modular Formation Dynamics Tester," Jun. 2002.

Schlumberger, "adnVision," Aug. 18, 2006.

Schlumberger, "E-Pulse," Sep. 7, 2006.

Schlumberger, "Overburden," Geology Aug. 18, 2006.

Schlumberger, "Filter Cake," Aug. 11, 2006.

Schlumberger, "Hydrostatic Pressure," "Drilling," and "Drilling Fluids," Aug. 7, 2006.

Schlumberger, "Pressure Versus Depth Plot," Aug. 7, 2006.

Schlumberger, "Pore Pressure," Aug. 7, 2006.

Haversten et al., "Pressure and Fluid Saturation Prediction in a Multicomponent Reservoir using combined Seismic and Electromagnetic Imaging," Geophysics, vol. 68, No. 5 (Sep.-Oct. 2003).

Stewart, R.R., "Depth Imaging of Reservoirs Using Well Logs, VSP, and Surface Seismic Data," ASEG/SEG Conference, Adelaide, 1088.

Lapin et al., "Joint VSP and Surface Seismic Tomography," SEG 2003.

Graziella, et al., "Integrating Borehole Information and Surface Seismic for Velocity Anisotropy Analysis and Depth Imaging," The Leading Edge, May 2001.

R.R. Stewart, 'Depth Imaging of Reservoirs using Well Logs, VSP and Surface Seismic Data,' ASEG/SEG Conference-Adelaide, 1988, pp. 358-361.

* cited by examiner

REAL-TIME VELOCITY AND PORE-PRESSURE PREDICTION AHEAD OF DRILL BIT

BACKGROUND OF INVENTION

The invention relates generally to subsurface drilling operations and particularly to techniques for predicting pore pressures ahead of a drill bit while drilling a borehole through subsurface formations.

A column of drilling fluid, usually referred to as "mud," is customarily provided in a borehole while drilling the borehole through subsurface formations. Usually, the weight of the mud is carefully selected such that the hydrostatic pressure gradient in at least the uncased section of the borehole is above the pore pressure gradient and below the fracture pressure gradient in the surrounding subsurface formations. If hydrostatic pressure gradient is lower than pore pressure gradient, a kick or blowout may occur. If hydrostatic pressure gradient is higher than fracture pressure gradient, lost circulation may occur. Fracture pressure typically increases rapidly with depth so that maintaining hydrostatic pressure gradient below fracture pressure gradient after drilling an initial section of the borehole is usually less of a problem. Pore pressure on the other hand generally follows a less predictable pattern. To avoid drilling hazards, it is desirable to know the pore pressure gradient ahead of the drill bit so that the mud weight needed to provide the desired hydrostatic pressure gradient in the borehole can be determined prior to drilling an interval ahead of the drill bit.

Methods are known in the art for predicting pore pressures ahead of a drill bit using well log data and/or seismic survey data. One common method of predicting pore pressures ahead of a drill bit using well log data involves determining a normal compaction curve from a well log, e.g., a sonic log, in combination with an appropriate geological model. The normal compaction curve corresponds to the increase in formation density that would be expected as a function of depth assuming absence of abnormal pressure. During drilling, a logging-while-drilling (LWD) sonic log is obtained and compared to the normal compaction curve. A consistent slowing trend of the LWD sonic log away from the normal compaction curve is used as a likely indicator of increased pore pressures ahead of the drill bit. This expected increase in pore pressures can be estimated from the amount of departure of the LWD sonic log from the normal compaction curve. The accuracy of this method largely depends on the accuracy of the well log data used in generating the normal compaction curve. Since this method relies on well logs, the well has to be drilled into the over-pressured zone for it to be detected.

U.S. Pat. No. 5,130,949 (issued to Kan et al.) discloses a method of predicting pore pressures ahead of a drill bit using well log data and surface seismic data. The method involves using well log data to estimate a shale fraction for a subsurface formation as a function of depth and the derivation of a shale compaction trend as a function of depth at intervals where the estimated shale fraction exceeds a threshold. A translation curve expressing pore pressure gradient as a function of sonic interval transit time departure from the shale compaction trend is also derived using the well log data. Seismic observations are performed along a surface line, and interval transit times as a function of depth along the surface line are estimated from the seismic observations. The departures of the seismic interval transit times from the shale compaction trend as a function of depth for points along the surface line are computed. The departures are translated into pore pressure gradient predictions using the translation curve. The patent suggests improving pore pressure predictions in deviated wells by adjusting interval transit time data for the shallower portion using check-shot data and applying the adjustments to an entire seismic section to obtain better depth.

U.S. Pat. No. 5,144,589 (issued to Hardage) discloses a method of estimating pore pressures ahead of a drill bit using drill-noise seismic. During drilling, the noise of the drill bit as it impacts the earth is used as a seismic source. Some seismic signals propagate directly from the drill bit to the surface. Some seismic signals propagate downwardly and are reflected back to the surface. The direct signals are used to determine interval velocity for each formation through which the drill bit has drilled, and the interval velocity is continuously updated as the drill bit penetrates the earth. The reflected signals are used to determine acoustic impedance for each formation ahead of the drill bit. The interval velocity data and acoustic impedance information are combined to produce a log-like impedance estimation curve, which reflects the pore pressures ahead of the drill bit. In particular, the low frequency velocity trend immediately above the drill bit is extrapolated to produce the low frequency velocity behavior for a short distance, e.g., 100 to 500 feet, below the drill bit. This low frequency behavior is then used to correct the acoustic impedance data for the formation ahead of the drill bit. Drill-noise seismic is generally inefficient in soft sediment, highly deviated boreholes, and while drilling with certain types of bits, such as polycrystalline diamond compact bits. Furthermore, estimation of acoustic impedance ahead of the bit from reflection data rarely works and is not reliable.

A new technique called seismic measurements-while-drilling (SMWD) has been applied to pore-pressure prediction ahead of a drill bit. In one implementation, a pore-pressure map is generated using surface seismic data. To obtain the map, velocities are estimated from pre-stack surface seismic data, and a velocity-to-pore-pressure transform appropriate for the area is used to convert the velocities to pore pressures. The pore-pressure map has the coordinates of the seismic shot position (horizontally) and seismic travel time (vertically). During drilling, SMWD is used to deliver real-time check-shot data. The check-shot data includes travel times of seismic waves generated at the surface as a function of depth. The check-shot data are used to place the drill bit on the pore pressure map, thereby allowing the pore pressures ahead of the drill bit to be determined. The accuracy of this method depends on the accuracy of the pore-pressure map predicted from the surface seismic data. In general, the accuracy of the pore-pressure map predicted in this manner decreases as depth increases because the velocities estimated from the surface seismic data become less accurate with increasing depth.

Thus a need remains for more robust techniques for estimating pore pressures ahead of a drill bit.

SUMMARY OF INVENTION

The invention provides a method of estimating velocity ahead of a drill bit which comprises generating seismic waves at a surface from at least two different source positions in the vicinity of a borehole, receiving seismic waves reflected from a reflector ahead of the drill bit at one or more locations in the borehole, determining travel times of the seismic waves received at the one or more locations in the borehole, and inverting the travel times to determine a velocity of a formation ahead of the drill bit. In one embodiment, the method further comprises transforming the velocity into pore pressure of the formation.

In another aspect, the invention provides a system for estimating velocity ahead of a drill bit which comprises at least one seismic source on a surface for generating seismic waves from at least two different source positions in the vicinity of a borehole and at least one seismic receiver in the borehole for detecting seismic waves reflected from a reflector ahead of the drill bit. The system further includes a measurements-while-drilling telemetry system for transmitting data from the seismic receiver to the surface and at least one processor comprising instructions for determining velocities ahead of the drill bit using travel times of seismic waves reflected from the reflector. In one embodiment, the processor further comprises instructions for converting velocities to pore pressures ahead of the drill bit.

In another aspect, the invention provides a method of estimating pore pressure ahead of a drill bit which comprises obtaining surface seismic survey data for a region of interest. During drilling of a borehole through the region, the method further includes determining a travel time of a seismic wave generated from a surface of the region to a location in the borehole when the drill bit is at selected depths in the borehole. The method further includes determining a velocity from the travel time and the selected depths, inverting the surface seismic survey data to determine a velocity ahead of the drill bit while constraining velocity between the surface and the drill bit to be consistent with the velocity determined from the travel time. In one embodiment, the method further comprises transforming the velocity ahead of the drill bit into pore pressure of a formation ahead of the drill bit.

Other features and advantages of the invention will be apparent from the following description and the appended claims.

DETAILED DESCRIPTION

In the following description, numerous specific details are set forth in order to provide a thorough understanding of the invention. It will be apparent, however, to one skilled in the art that the invention may be practiced without some or all of these specific details. In other instances, well-known features and/or process steps have been described in brief detail for clarity of the invention.

Figure 1:
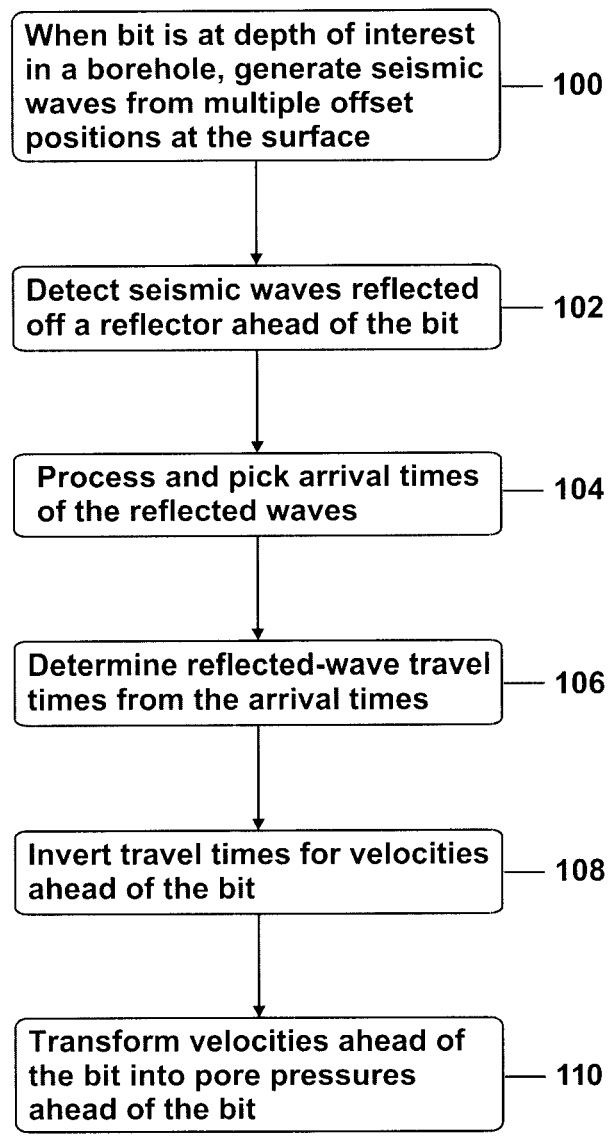
FIG. 1 is a flowchart illustrating a method of predicting pore pressures ahead of a drill bit according to an embodiment of the invention.

FIG. 1 is an overview of a method of predicting pore pressures ahead of a drill bit in accordance with one embodiment of the invention. The method can be used to predict pore pressure as the drill bit penetrates subsurface formations. The method works as follows: when the drill bit is at a depth of interest in a borehole, one or more seismic sources on a surface are activated to generate seismic waves at multiple offset positions along the surface (100). The seismic waves are generated at predetermined times. In the borehole, one or more seismic receivers on a drill string are used to detect seismic waves reflected off a target reflector ahead of the drill bit (102). Preferably there are multiple receivers or one receiver at multiple depths for velocity filtering of direct and reflected waves, as is well known in the art. The seismic waves received at the seismic receivers are processed, and the arrival times of the seismic waves are picked (104). The travel times of the reflected seismic waves are determined using the picked arrival times (106). The travel times of the reflected seismic waves are then inverted to determine velocities in formations ahead of the drill bit (108). The velocities ahead of the drill bit are transformed into pore pressures using known velocity-to-pore-pressure relations (110), e.g., Hottman-Johnson relation. (Hottman, C. E., and Johnson, R. K., "Estimation of Formation Pressures from Log-Derived Shale Properties," JPT, Vol. 17, June 1965, pp 717-22.)

In step 100, the seismic waves could be generated by a single seismic source that is offset from the borehole in a predetermined manner. Alternately, multiple seismic sources could be used to generate the seismic waves at the multiple offset positions. The offset positions at which the seismic waves are generated relative to the borehole can range from zero to a maximum value. Typically, the maximum offset is not greater than half of the depth of the drill bit. In general, the maximum offset depends on the depth of the drill bit, the depth of the target reflector, and general velocity trends. The number of offset positions needed depends on the assumed velocity model of the zone between the drill bit and the reflector. For a simplistic two-velocity model, two offset positions, e.g., one at the borehole and the other at the maximum offset, are the minimum required. In practice, more offset positions may be required to combat noise and uncertainties in anisotropy and to account for complicated velocity models.

Figure 2:
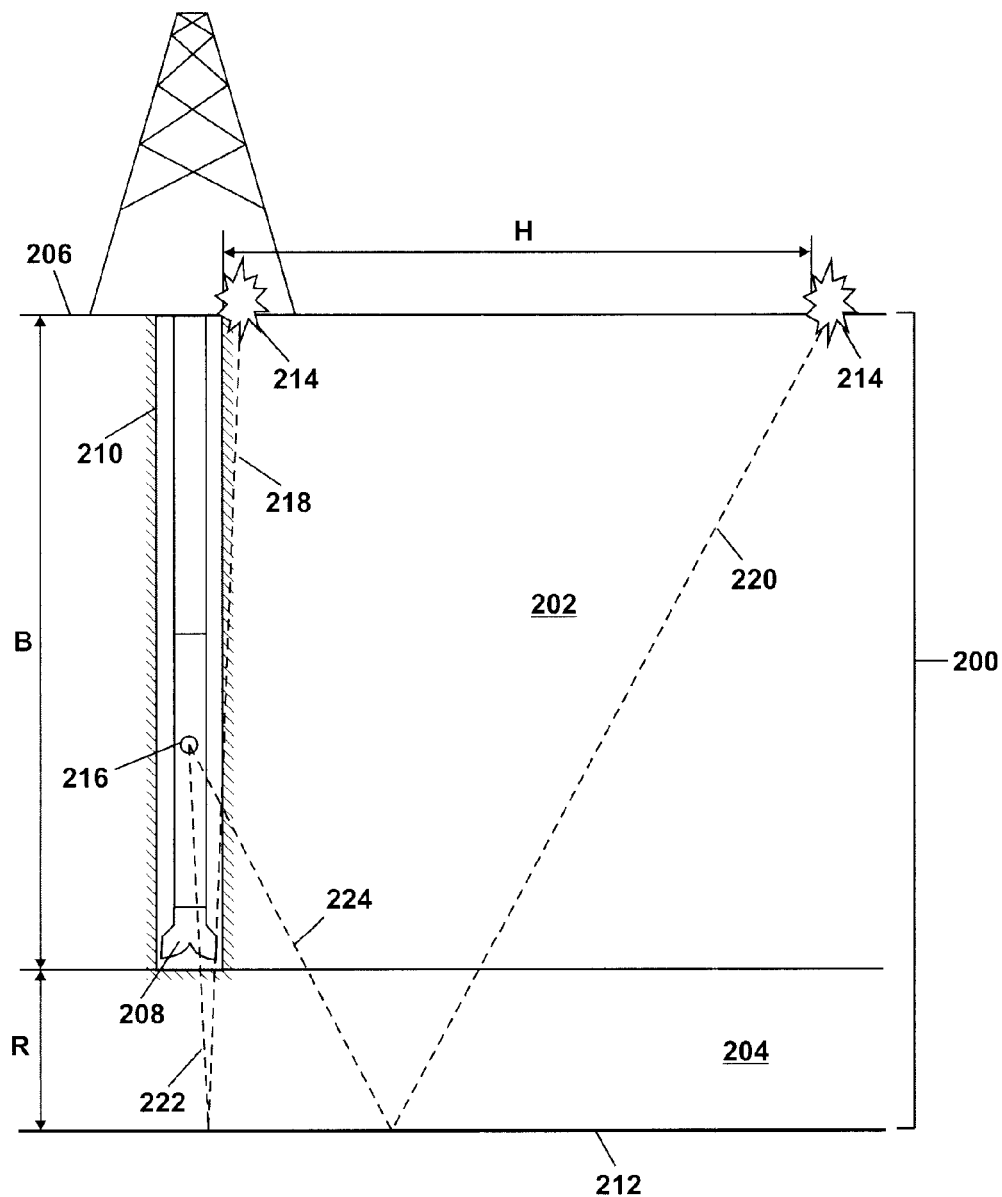
FIG. 2 illustrates a velocity model according to an embodiment of the invention.

FIG. 2 illustrates a simple two-velocity model where subsurface formations 200 are viewed as consisting of two layers 202, 204. The layer 202 extends from the surface 206 to the depth of a drill bit 208, which is located in a borehole 210 in the subsurface formations 200. The layer 204 extends from the depth of the drill bit 208 to a target reflector 212 ahead of the drill bit 208. The velocities in the layers 202, 204 can be represented with a single average velocity respectively. For discussion purposes, let Vo be the average velocity from the surface 206 to the depth of the drill bit 208 and Vp be the average velocity from the drill bit 208 to the reflector 212. Further, let H be the offset position relative to the borehole 210 at which a seismic wave is generated, B be the depth of the drill bit 208, and R be the distance from the drill bit 208 to the reflector 212. If Snell's law is ignored (i.e., using straight ray paths), then the reflected-wave travel time, i.e., the time it takes a seismic wave generated from a source 214 at the surface 206 to travel down to the reflector 212 and back up to a downhole seismic receiver 216, can be expressed as:

$$T(Vp, R) = \frac{2\sqrt{R^2 + X^2}}{Vp} + \frac{\sqrt{B^2 + (H - 2X)^2}}{Vo}; \quad \overline{X} = \frac{RH}{2R + B} \quad (1)$$

H, B, and Vo are known, and R and Vp are unknown. Vo can be obtained from a combination of pre-drill information, well-log data, LWD logs, and real-time check-shot data. Because there are two unknowns, at least two reflection events, producing two reflected-wave travel times, are needed to determine R and Vp. Two reflection events can be obtained by generating two seismic waves 218, 220 at two offset positions at the surface 206 and measuring the travel time of the ensuing reflected waves 222, 224, respectively. The solutions would most likely be found using numerical techniques. Therefore, the more the travel time data available, the better the results can be.

A more complicated velocity model can be used to improve the accuracy of the method described above. For example, the subsurface formations 200 can be treated as consisting of several horizontal layers instead of just two layers. In this case, a series of velocities would be defined for the section between the surface 206 and depth of the drill bit 208. The velocities of the horizontal layers in this section could be obtained from real-time check-shot data and/or well log data, e.g., sonic logs. The real-time check-shot data is obtained by generating seismic waves at the surface. The seismic waves are generated in the vicinity of the borehole for selected bit depths, usually corresponding to depths at which drill pipe connections are made. The seismic waves (direct arrivals) are detected downhole by one or more seismic receivers on a drill string. The detected waveforms or the first arrival times of the detected waveforms are then sent to the surface via measurements-while-drilling (MWD) telemetry when mud circulation resumes. Real-time check-shot data collected for two different bit depths can be used to compute the interval velocity between the two bit depths.

The section between the drill bit 208 and the target reflector 212 may be modeled as one effective layer having an average velocity or may be represented by a parameterized curve that allows for some smooth variation in velocity with depth. In this case, the reflected-wave travel time could be computed by a ray tracing algorithm, and the unknown parameters, i.e., distance of drill bit to reflector and velocities ahead of drill bit, can be estimated by fitting the computed reflected-wave travel times to the measured reflected-wave travel times, for example, using least-squares technique.

Figure 3A:
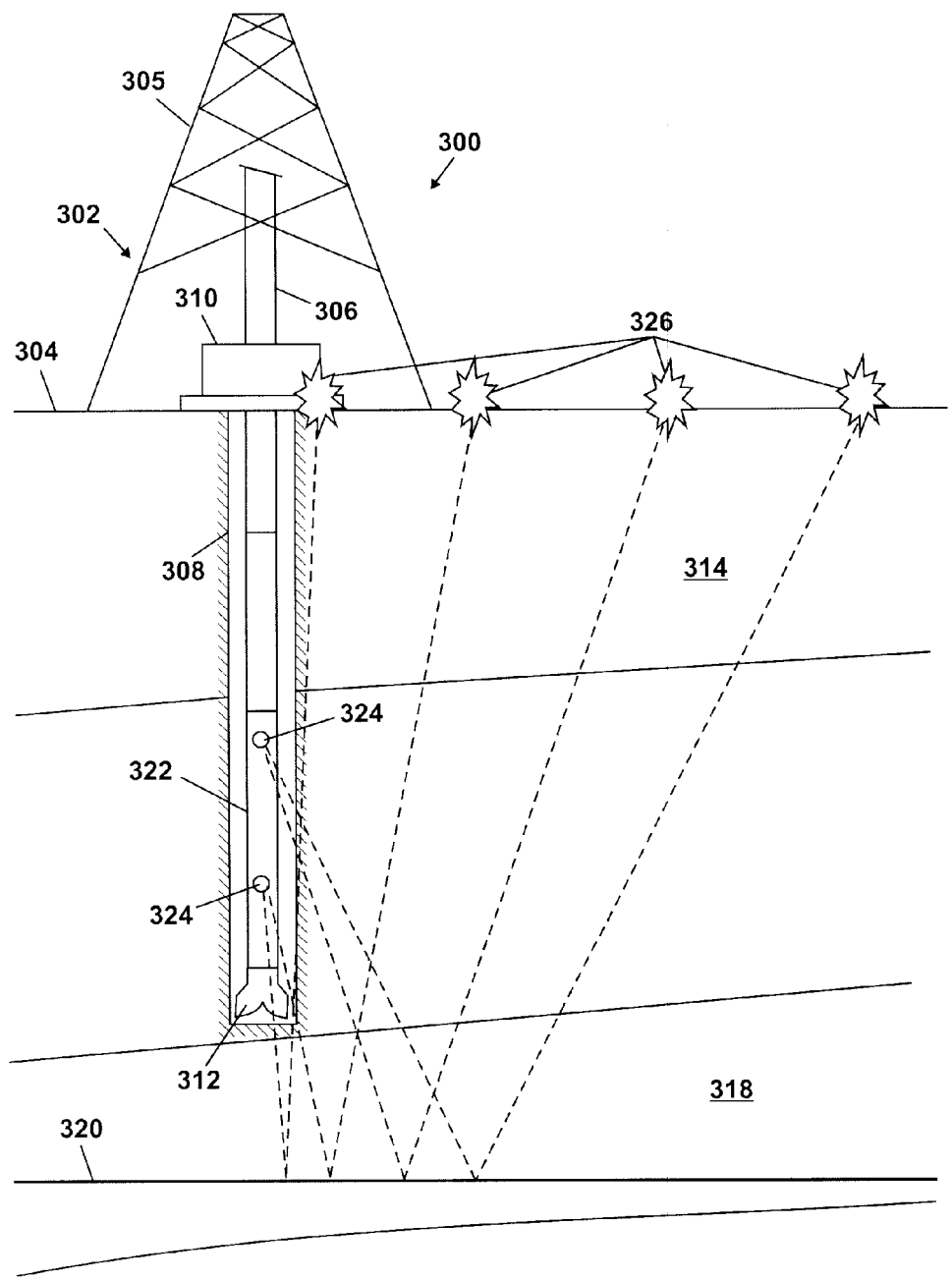
FIG. 3A shows a drilling system suitable for practicing an embodiment of the invention.

FIG. 3A shows an example of a drilling system 300 suitable for practicing the present invention. The drilling system 300 includes a rig 302 positioned on a surface 304. The rig 302 is shown as a land rig, but could also be an offshore rig in other embodiments. The rig 302 includes a derrick 305 with an attached drill string 306. The drill string 306 extends into a borehole 308 through a wellhead 310. A drill bit 312 is appended to the drill string 306 for drilling the borehole 308 through subsurface formations 314. As the drill bit 312 penetrates the subsurface formations 314, mud pumped down the drill string 306 is forced out of the nozzles of the drill bit 312 into the bottom of the borehole 308. The mud at the bottom of the borehole 308 rises up the borehole 308 and is diverted to a mud return system (not shown) on the rig 302. The drill bit 312 is located above a zone 318 in the subsurface formations 314. The zone 318 may have abnormal pore pressures, for example. Therefore, it is helpful to know the pore pressures likely to be encountered in the zone 318 prior to drilling through the zone 318. This information is useful in selecting the weight of the mud needed to maintain the proper hydrostatic pressure gradient in the borehole 308 while drilling the zone 318.

In one embodiment, the zone 318 includes a strong reflector 320 or is located between the drill bit 312 and a strong reflector 320. The drill string 306 includes a downhole tool 322, which includes one or more seismic receivers 324 that can detect seismic waves reflected off the reflector 320 as well as other seismic waves propagating in the subsurface formations 314. The seismic waves reflected off the reflector 320 are generated by one or more seismic sources 326 on the surface 304. The seismic sources 326 are offset from the borehole 308, where the offset value can range from zero to a maximum value depending on the depth of the drill bit 312, the depth of the reflector 320, and general velocity trends. The number of seismic sources 326 or offset positions would depend on the assumed velocity model of the zone between the drill bit 312 and the reflector 320. It should be noted that one or more seismic sources may be moved between the various offset positions, i.e., it is not necessary to have a seismic source per offset position.

Also, it is not necessary to have the drill bit 312 in the same depth position for various offset positions of the source. The drill bit 312, and the seismic receivers 324, can be anywhere above the look-ahead zone 318 for different offset positions as long as they can detect the reflected events from horizon 320. In this case, numerical ray tracing algorithms can be used to compute travel times of reflected events. The unknown velocities ahead of the bit can be estimated by fitting the computed reflected wave travel times to the measured reflected wave travel times. For example, this can be accomplished using least squares techniques. This may be important in practice since one or several sources can be moved between offset positions as the drilling proceeds above zone 318.

Figure 3B:
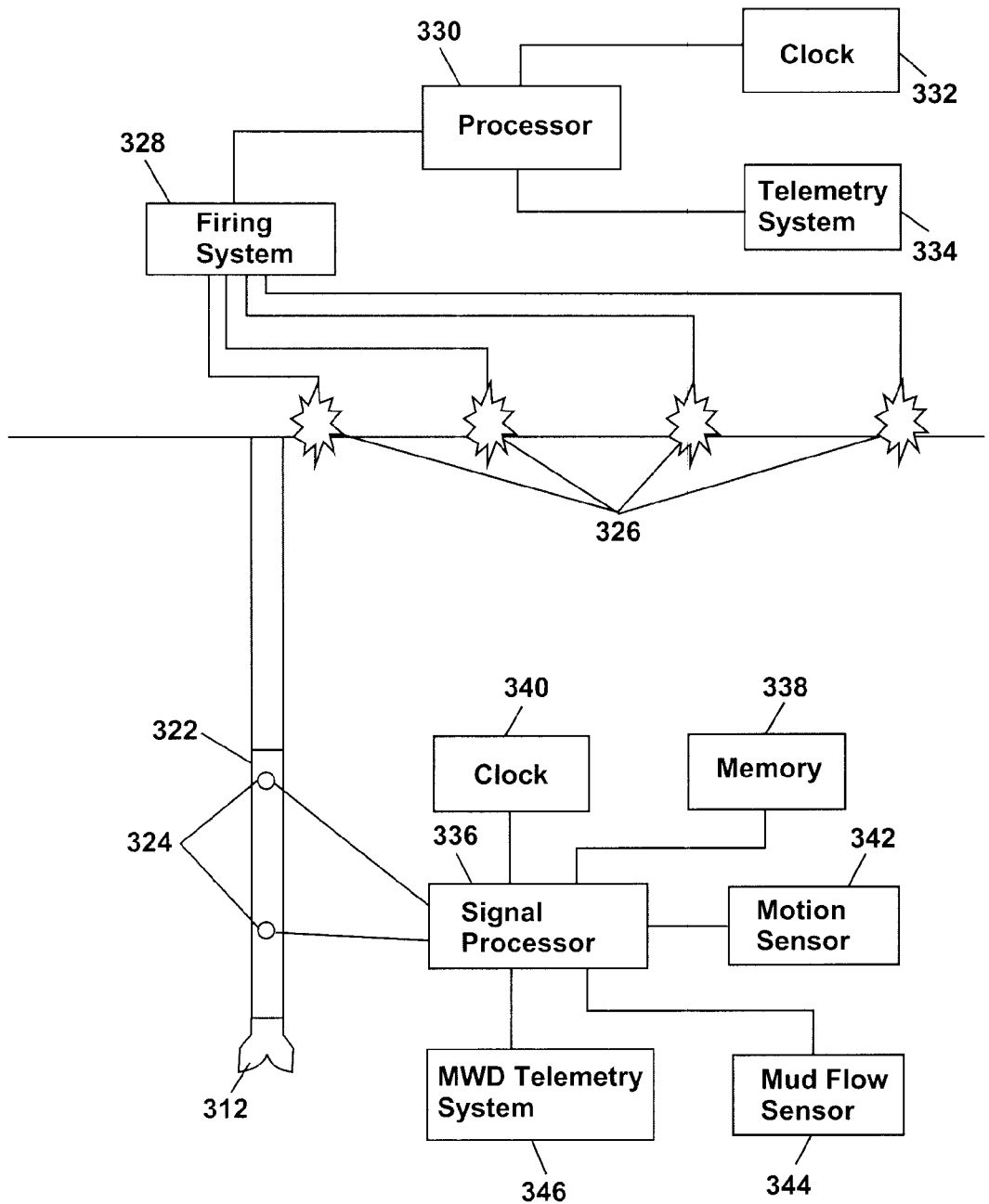
FIG. 3B illustrates a SMWD system suitable for practicing an embodiment of the invention.

FIG. 3B illustrates a SMWD system that includes the seismic receivers 324 and the seismic sources 326. The seismic sources 326 are coupled to a firing system 328, which is coupled to a processor 330 and clock 332. The firing system 328 activates the seismic sources 326 in response to instructions from the processor 330. The processor 330 is programmed to cause the firing system 328 to activate the seismic sources 326 according to a schedule known by the seismic receivers 324. A telemetry system 334 is also coupled to the processor 330 and receives data measured by the seismic receivers 324. The seismic receivers 324 are coupled to a signal processor 336. Memory 338 and clock 340 are also coupled to the signal processor 336 so that recordings may be made of waves detected by the seismic receivers 324 in synchronization with firing of the seismic sources 326. A motion sensor 342, a mud flow sensor 344, and MWD telemetry equipment 346 are coupled to the signal processor 336 for transmitting data to the telemetry system 334.

Returning to FIG. 3A, when it is desired to predict pore pressures ahead of the drill bit 312, circulation of mud and motion of drill string 306 are preferably stopped. Thereafter, the seismic sources 326 are activated in a predetermined sequence known to the downhole tool 322 to generate seismic waves. The seismic waves propagate down the subsurface formations 314. The seismic waves reaching the reflector 320 are reflected back towards the surface 304. The seismic receivers 324 detect the up-going waves, i.e., the reflected waves, as well as the down-going waves, i.e., the direct waves. The detected waveforms (or representations of the detected waves) may be stored in memory (338 in FIG. 3B).

In one embodiment, when mud circulation resumes, the detected waveforms stored in memory (338 in FIG. 3B) are sent to the surface via MWD telemetry (346 in FIG. 3B) and received at the surface via telemetry system (334 in FIG. 3B). The detected waveforms may be sent to the surface in full or compressed format. The time required to send the detected waveforms depends on the available MWD telemetry rate as well as the number of bits/sample required, which is related to the strength of the detected waves. In this embodiment, the processor (330 in FIG. 3B) at the surface runs algorithms to separate the up-going (reflected) waves from the down-going (direct) waves. Techniques for making this separation are known in the art. The reflected waves are then processed to pick their arrival times. Techniques for processing waveforms to pick their arrival times are known in the art.

In another embodiment, instead of sending the detected waveforms to the surface for processing, the processor (336 in FIG. 3B) may include instructions for separating the up-going (reflected) waves from the down-going (direct) waves. The reflected waves may be processed downhole for picking of their arrival times or the reflected waves may be sent to the surface for processing. When mud circulation resumes, the arrival times of the reflected waves or the reflected waves themselves are then transmitted to the surface via MWD telemetry (346 in FIG. 3B) and received at the surface via telemetry system (334 in FIG. 3B). In the latter case, further processing at the surface is needed to pick the arrival times of the reflected waves.

Once the arrival times of the reflected waves are known, the travel times of the reflected waves can be determined and used to compute the velocities ahead of the drill bit. The velocities can then be transformed into pore pressures ahead of the drill bit. In operation, the clock (332 in FIG. 3B) at the surface keeps track of the time the seismic waves are generated, while the clock (340 in FIG. 3B) downhole keeps track of the time the reflected waves are detected. These two clocks allow the arrival times and travel times of the seismic waves to be determined and allow coordination of the generation and detection of the seismic waves. It is preferable that both clocks are in sync and are accurate enough to allow velocities to be computed with desired accuracy. The desired accuracy of the clocks depends on the particular method used in computing the velocities.

Figure 4:
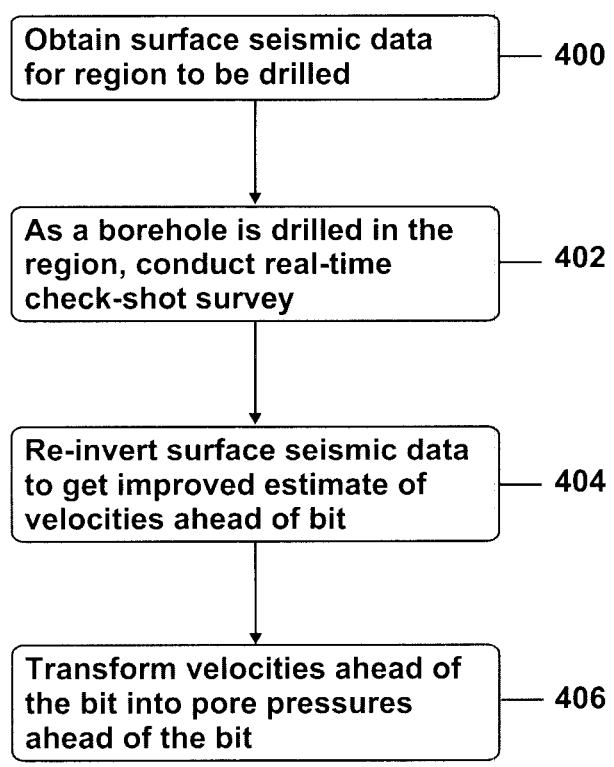
FIG. 4 is a flowchart illustrating a method of predicting pore pressures ahead of a drill bit according to another embodiment of the invention.

FIG. 4 is an overview of a method of predicting pore pressures ahead of a drill bit according to another embodiment of the invention. The method starts by acquiring surface seismic data for the geological area of interest (400). Methods for acquiring surface seismic data are well known in the art. Briefly, surface seismic data can be acquired by shooting multiple seismic waves at different locations on the surface of the geological area. As an example, the seismic sources could be explosive charges (on land) or air guns (at sea). The seismic waves travel down the subsurface formations and pass through or reflect off a target. In reflection seismic surveys, the reflected seismic waves are detected and recorded using, for example, geophone (on land) or hydrophones (at sea). The seismic waves are recorded at the surface at various distances from the seismic shot positions. For each source-receiver pair, the travel time of the seismic wave from the source to the receiver is determined from the arrival time of the recorded seismic wave.

As well known in the art, the surface seismic data can be used to estimate velocities of the subsurface formations (see, for example, Ozdogan Yilmaz, "Seismic Data Processing," Society of Exploration Geophysics, 1987). These estimated velocities are typically known as pre-drill velocities because the surface seismic data are usually obtained prior to actually drilling the borehole. A pore-pressure map can be generated using these pre-drill velocities, allowing pore pressures ahead of the drill bit to be determined as the borehole is drilled. However, the accuracy of the pre-drill velocities decrease with increasing depth, leading to less accurate pore-pressure prediction with increasing depth. To improve accuracy of pore-pressure predictions made from pre-drill velocities, the inventors propose updating the surface seismic data with real-time check-shot survey data. With real-time check-shot survey data, accurate measurements of velocities from the surface to specific depths in the borehole, between the surface and the drill bit, can be obtained. These accurate velocities can then be used in place of the pre-drill velocities in the section from the surface to the drill bit while predicting pore pressures ahead of the drill bit.

From the foregoing, the method further includes conducting check-shot surveys as the borehole is drilled and delivering the check-shot information to the surface in real-time (402). A check-shot survey involves firing a seismic source at the surface, near the opening of the borehole. The seismic wave generated travels down the subsurface formations and is detected and recorded by a receiver in the borehole. This is done when the receiver, which is typically placed on the drill string, is located at the depth of interest. The drill string may include a downhole tool that can process the recorded wave to determine the arrival time of the wave at the receiver location. Alternatively, processing can be done at the surface. Either the recorded waveform or the picked arrival time is sent to the surface via MWD telemetry. To reduce noise in the data, it is preferable to temporarily stop drilling while making the check-shot survey. The waveform or arrival time can then be transmitted to the surface when drilling resumes. To avoid lost drilling time, it is preferable to make check-shot measurements during pipe connections. The travel time of the seismic wave from the seismic source to the receiver can be determined from the arrival time. The travel time can then be used to calculate average velocity of the subsurface formations above the drill bit. Sometimes, it is convenient and accurate to subdivide the subsurface formations into a series of intervals. In this case, a series of travel times acquired in the manner described above can be used to calculate the average velocity for each interval.

Figure 5:
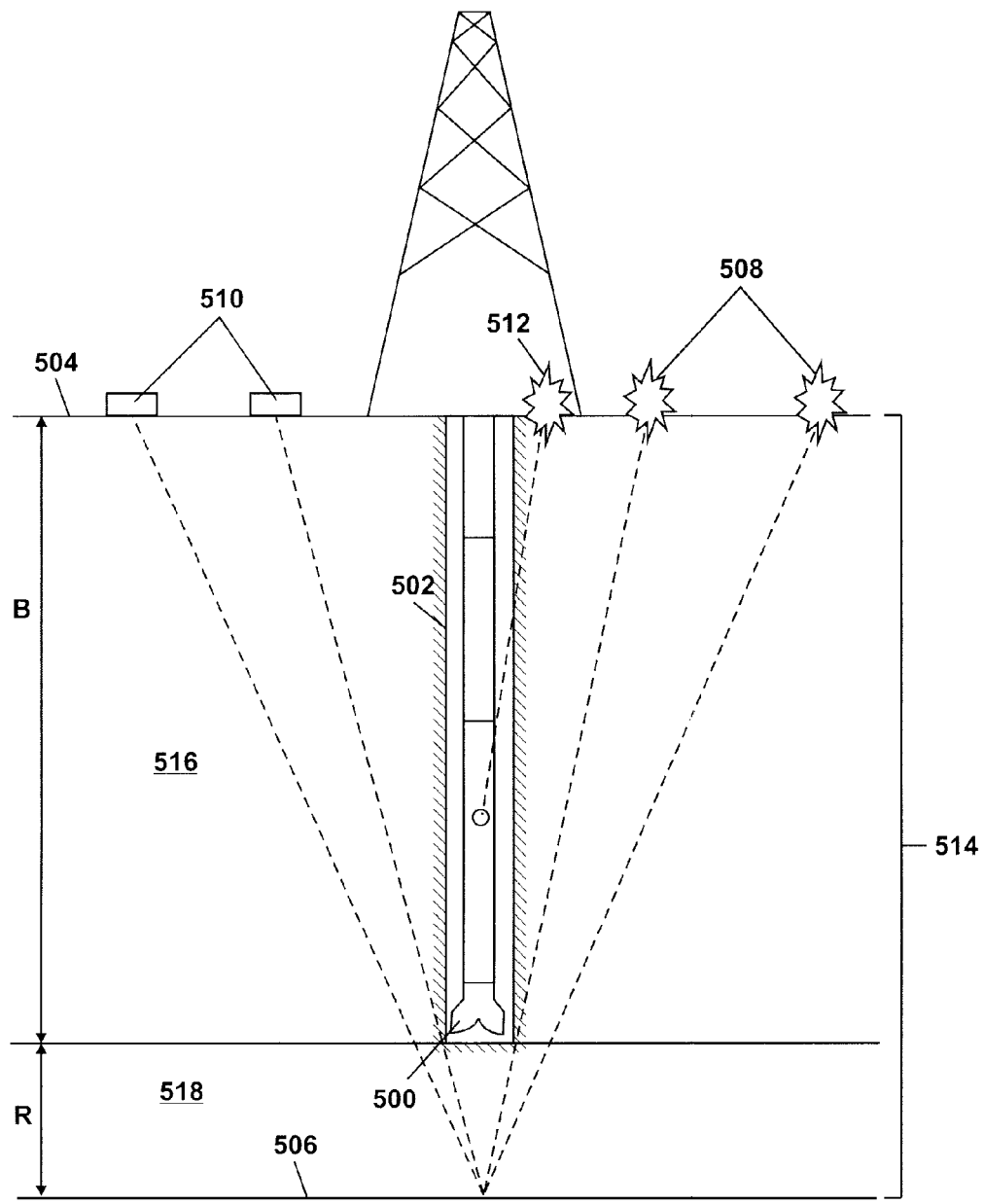
FIG. 5 illustrates a velocity model according to another embodiment of the invention.

The next step is to re-invert the surface seismic data using the check-shot data to obtain improved velocities ahead of the drill bit (404). FIG. 5 shows a simple velocity model that can be used in re-inverting the surface seismic data. In this model, the drill bit 500 is shown at a desired position in the borehole 502, above a zone of interest 518, which is located above or includes a target reflector 506. Multiple seismic shot positions 508 and receiver positions 510 are superimposed on the model. The seismic shot positions and receiver positions are used prior to drilling the borehole to acquire surface seismic data, as previously explained. In this case, the seismic shot positions and receiver positions of interest are those that measure reflection events in the vicinity of the borehole 502 or have a common midpoint at the borehole 502. Also shown in the figure is the seismic shot position 512 used in making check-shot survey. The model assumes that the subsurface formations 514 can be viewed as a two-layer system, where one layer 516 is defined above the depth of the drill bit 500 and the other layer 518 is defined between the depth of the drill bit 500 and the reflector 506.

Assuming that Snell's law can be ignored (i.e., using straight ray paths), then using the model described above, the travel time observed by a source-receiver pair on the surface can be expressed as:

$$T(Vp, R) = \frac{\sqrt{R^2 + X^2}}{Vp} + \frac{\sqrt{B^2 + (H - X)^2}}{Vo}; \quad \overline{X} = \frac{RH}{R + B} \quad (2)$$

where H is the offset distance between the source and the receiver, B is the bit depth, Vo is the average velocity from the surface to the bit depth, R is the distance from the drill bit to the reflector, and Vp is the average velocity in the zone between the drill bit and the reflector. H and B are known. T can be obtained for various values from the surface seismic data. Returning to FIG. 4, Vo is computed from the real-time check-shot survey in step (402) instead of from the surface seismic data obtained in step (400). R and Vp are unknown.

To obtain R and Vp, equation (2) above is inverted. At least two sets of T and H values for the selected bit depth B are needed to compute R and Vp, but accuracy generally improves with more data sets. Vo is the same for a given bit depth B for all source offset positions.

Once the velocity ahead of the drill bit (Vp) is known, the pore pressure ahead of the drill bit can be determined using any suitable velocity-to-pore-pressure relation, e.g., Hottman-Johnson relation, (406). To improve the accuracy of the pore-prediction method, a velocity model that is more complicated than the one described above can be used. For example, instead of treating the subsurface formations as a two-layer system, the subsurface formations could be divided into several horizontal layers, each layer having its own associated average or interval velocity. The interval velocities for the layers between the surface and the drill bit can be obtained from the real-time check-shot data. This allows variations in the velocities above the drill bit to be accounted for while determining the velocities ahead of the drill bit. The section between the drill bit and the reflector may be modeled as one effective layer having an average velocity or may be represented by a parameterized curve that allows for some variation with depth.

It will be apparent to those skilled in the art that this invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art.

The invention provides several advantages over conventional techniques. The method of predicting pore pressures ahead of a drill bit is based on getting look-ahead velocities in near real-time and relating these to look-ahead pore pressures by known transforms. The method is superior to techniques using only surface seismic velocities because it incorporates accurate real-time measurements of velocities measured above the drill bit to increase the accuracy of estimated velocities ahead of the drill bit. Velocities from surface seismic alone degrade, i.e., become less accurate as depth increases. Further, methods that invert impedance profiles ahead of the drill bit are known to have limited success. One reason is that reflection data is a good measure of sharp impedance variations ahead of the drill but, but it does not contain "slow" impedance variations. Reflection data does not give the "velocity" itself ahead of the bit, instead it gives "change in velocity" or the derivative of the velocity. Therefore, one needs to "assume" the velocity trends ahead of the bit to use these techniques. The present invention, on the other hand, uses the actual measured velocities ahead of the bit.

While the invention has been described with respect to a limited number of embodiments, those skilled in the art, having benefit of this disclosure, will appreciate that other embodiments can be devised which do not depart from the scope of the invention as disclosed herein. For the purposes of this specification it will be clearly understood that the word "comprising" means "including but not limited to", and that the word "comprises" has a corresponding meaning.

The invention claim is:

1. A method for estimating pore pressure ahead of a drill bit comprising:
   disposing the drill bit into a borehole penetrating a subsurface formation, wherein the drill bit is coupled to a drill string of a drilling system and the subsurface formation includes a target reflector located at a depth ahead of the drill bit;
   generating seismic waves from at least one surface seismic source at at least one offset position within a maximum offset distance from an entrance of the borehole at the surface of the Earth, wherein the maximum offset distance is determined based upon the depth of the drill bit, the depth of the target reflector, and known velocity trends in the subsurface formation;
   using at least one seismic receiver disposed on the drill string to detect reflected seismic waves from the target reflector;
   determining the travel time of the reflected seismic waves;
   inverting the travel time of the reflected seismic waves to determine velocities ahead of the drill bit; and
   using the determined velocities ahead of the drill bit to determine pore pressures ahead of the drill bit.

2. The method of claim 1, wherein the maximum offset distance from the borehole is less than half the depth of the drill bit in the subsurface formation.

3. The method of claim 1, wherein the number of offset positions is determined based on an assumed velocity model of a zone within the subsurface formation between the drill bit and the target reflector.

4. The method of claim 3, wherein the at least one surface seismic source comprises, for each determined offset position, a respective corresponding surface seismic source, and generating the seismic waves comprises generating seismic waves using each of the surface seismic sources.

5. The method of claim 3, wherein the at least one surface seismic source comprises a single surface seismic source that is used at each determined offset position to generate the seismic waves.

6. The method of claim 3, wherein the assumed velocity model is at least a two-velocity model that defines the subsurface formation as including a first layer extending from the surface to the drill bit depth and a second layer extending from the drill bit depth to the target reflector depth, wherein the first layer has a first average velocity and the second layer has a second average velocity.

7. The method of claim 6, wherein the travel time of the reflected seismic waves is determined using the following equation:

$$T(Vp, R) = \frac{2\sqrt{R^2 + X^2}}{Vp} + \frac{\sqrt{B^2 + (H - 2X)^2}}{Vo}$$

wherein $T(Vp, R)$ represents the travel time of the reflected seismic waves, $V_o$ represents the first average velocity, $V_p$ represents the second average velocity, R represents the distance from the drill bit to the target reflector, B represents the distance from the surface to the drill bit, and X is expressed as:

$$X = \frac{RH}{2R + B}.$$

8. The method of claim 7, wherein the at least one surface seismic source comprises at least two surface seismic sources located at different respective offset positions within the maximum offset distance.

9. The method of claim 7, wherein $V_o$ is determined based on a combination of pre-drill information, well-log data, logging-while-drilling logs, and real-time check-shot data.

10. The method of claim 3, wherein the assumed velocity model defines a first section between the surface to the drill bit depth as comprising a plurality of horizontal layers, wherein the velocities of each of the plurality of horizontal layers is obtained from at least one of real-time check-shot data or well log data, or a combination thereof.

11. The method of claim 10, wherein the assumed velocity model defines a second section between the drill bit and the target reflector as being represented by a parameterized curve allowing for variation in velocity with depth.

12. The method of claim 11, wherein the travel time of the reflected waves is computed by a ray tracing algorithm.

13. The method of claim 11, wherein the distance between the drill bit and the reflector and the velocities ahead of the drill bit are determined by fitting computed travel times of the reflected waves to measured travel times of the reflected waves.

14. The method of claim 13, wherein the fitting comprises using a least-squares technique.

15. The method of claim 1, wherein the pore pressures ahead of the drill bit are determined using velocity-to-pore pressure relationships.

16. A system for estimating pore pressure ahead of a drill bit comprising:
means for disposing the drill bit into a borehole penetrating a subsurface formation including a target reflector located at a depth ahead of the drill bit;
means for generating seismic waves from at least one offset position within a maximum offset distance from an entrance of the borehole at the surface of the Earth, wherein the maximum offset distance is determined based upon the depth of the drill bit, the depth of the target reflector, and known velocity trends in the subsurface formation;
means for detecting reflected seismic waves from the target reflector;
means for determining the travel time of the reflected seismic waves;
means for inverting the travel time of the reflected seismic waves to determine velocities ahead of the drill bit; and
means for using the determined velocities ahead of the drill bit to determine pore pressures ahead of the drill bit.

17. The system of claim 16, wherein the at least one offset position includes a number of offset positions determined based on an assumed velocity model of a zone within the subsurface formation between the drill bit and the target reflector.

18. The system of claim 17, wherein the assumed velocity model is at least a two-velocity model that defines the subsurface formation as including a first layer extending from the surface to the drill bit depth and a second layer extending from the drill bit depth to the target reflector depth, wherein the first layer has a first average velocity and the second layer has a second average velocity.

19. The system of claim 18, wherein the travel time of the reflected seismic waves is determined using the following equation:

$$T(Vp, R) = \frac{2\sqrt{R^2 + X^2}}{Vp} + \frac{\sqrt{B^2 + (H - 2X)^2}}{Vo}$$

wherein $T(Vp, R)$ represents the travel time of the reflected seismic waves, $V_o$ represents the first average velocity, $V_p$ represents the second average velocity, R represents the distance from the drill bit to the target reflector, B represents the distance from the surface to the drill bit, and X is expressed as:

$$X = \frac{RH}{2R + B}.$$

* * * * *